US006603584B1

(12) United States Patent
Jokerst et al.

(10) Patent No.: US 6,603,584 B1
(45) Date of Patent: Aug. 5, 2003

(54) SYSTEM AND METHOD FOR BI-DIRECTIONAL OPTICAL COMMUNICATION

(75) Inventors: Nan Marie Jokerst, Atlanta, GA (US); Martin Anthony Brooke, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 09/383,883

(22) Filed: Aug. 26, 1999

Related U.S. Application Data
(60) Provisional application No. 60/097,981, filed on Aug. 26, 1998, and provisional application No. 60/097,946, filed on Aug. 26, 1998.

(51) Int. Cl.⁷ .............................................. H04B 10/00
(52) U.S. Cl. ........................ 359/152; 359/153; 359/154; 385/14
(58) Field of Search ................. 359/152, 153, 359/154, 159, 163; 257/80, 81, 82, 84; 385/14

(56) References Cited

U.S. PATENT DOCUMENTS

| | | | | |
|---|---|---|---|---|
| 4,422,181 A | * | 12/1983 | Grafton et al. | 359/114 |
| 4,611,884 A | * | 9/1986 | Roberts | 385/44 |
| 4,775,971 A | * | 10/1988 | Bergmann | 359/168 |
| 4,890,895 A | * | 1/1990 | Zavracky et al. | 385/14 |
| 5,347,601 A | * | 9/1994 | Ade et al. | 385/3 |
| 5,357,363 A | * | 10/1994 | Li et al. | 359/161 |
| 5,400,419 A | * | 3/1995 | Heinen | 385/14 |
| 5,424,860 A | * | 6/1995 | Mihara | 359/152 |
| 5,546,212 A | * | 8/1996 | Kunikane et al. | 359/163 |
| 5,818,984 A | * | 10/1998 | Ahmad et al. | 385/14 |
| 6,097,521 A | * | 8/2000 | Althaus et al. | 359/143 |
| 6,188,495 B1 | * | 2/2001 | Inoue et al. | 359/152 |
| 6,301,035 B1 | * | 10/2001 | Schairer | 359/152 |
| 6,353,491 B1 | * | 3/2002 | Tanaka et al. | 359/152 |

OTHER PUBLICATIONS

Jokerst, et al., "Thin–Film Multimaterial Optoelectronic Integrated Circuits," IEEE Transactions on Components, Packaging, and Manufacturing Technology–Part B, Feb. 1996, vol. 19, No. 1, pp. 97–106.

Vendier, et al., "High Efficiency Thin–Film GaAs–based MSM Photodetectors," Electronics Letters, Feb. 15, 1996, vol. 32, No. 4, pp. 394–395.

Vendier, et al., "Stacked Silicon CMOS Circuits with a 40–Mb/x Through–Silicon Optical Interconnect," IEEE Photonics Technology Letters, Apr. 1998, vol. 10, No. 4, pp. 606–608.

Vendier, et al., "Thin–Film Inverted MSM Photodetectors," IEEE Photonics Technology Letters, Feb. 1996, vol. 8, No. 2, pp. 266–268.

* cited by examiner

*Primary Examiner*—John Tweel
(74) *Attorney, Agent, or Firm*—Thomas, Kayden, Horstemeyer & Risley, LLP

(57) ABSTRACT

Disclosed is a bi-directional optical link and method. The bi-directional optical link comprises a detector having an upper surface facing a predetermined direction and a beam turning device located over the surface. The bi-directional optical link also includes an emitter oriented to direct a beam of light toward the beam turning device, the beam turning device redirecting the beam of light toward the predetermined direction.

31 Claims, 8 Drawing Sheets

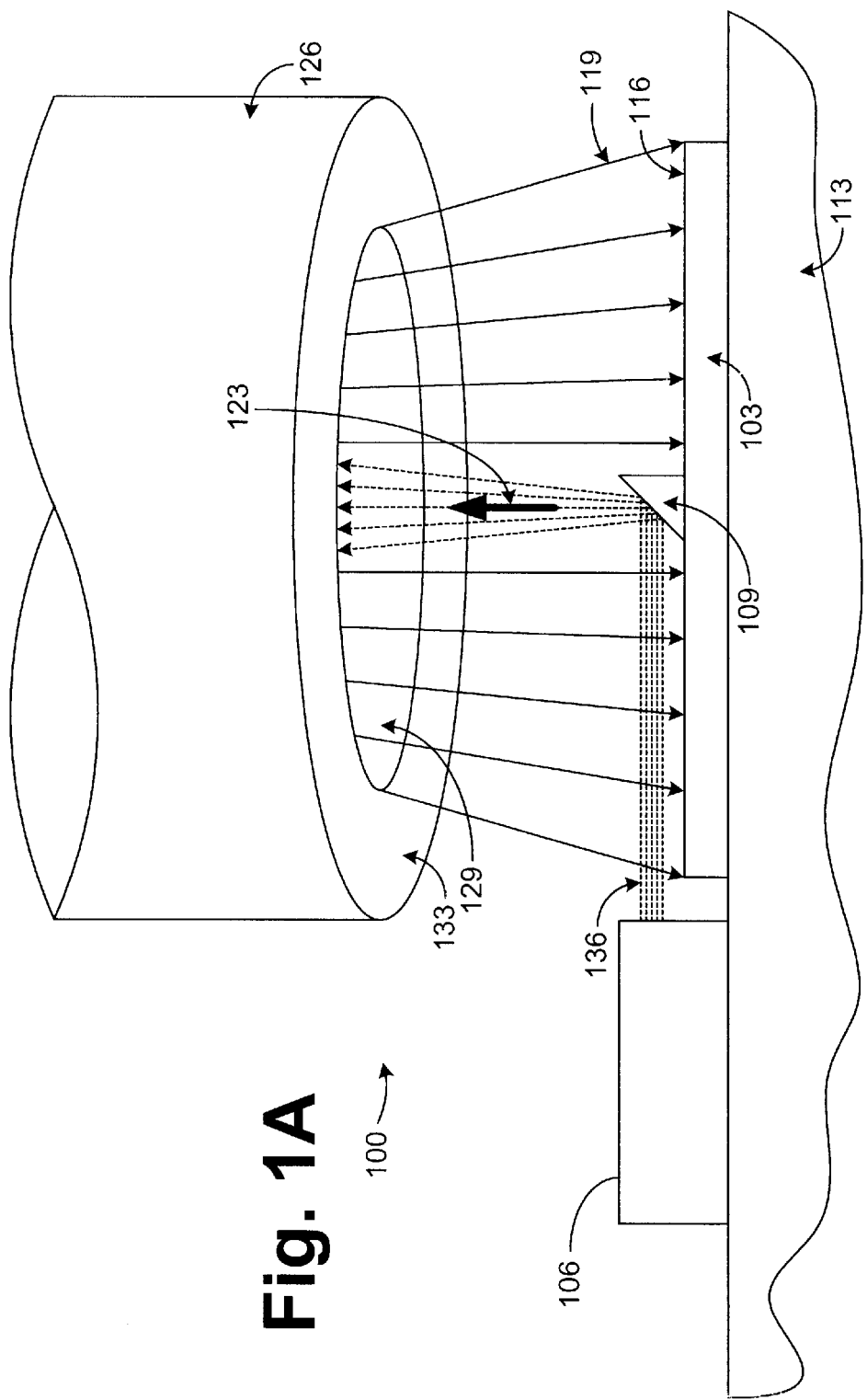

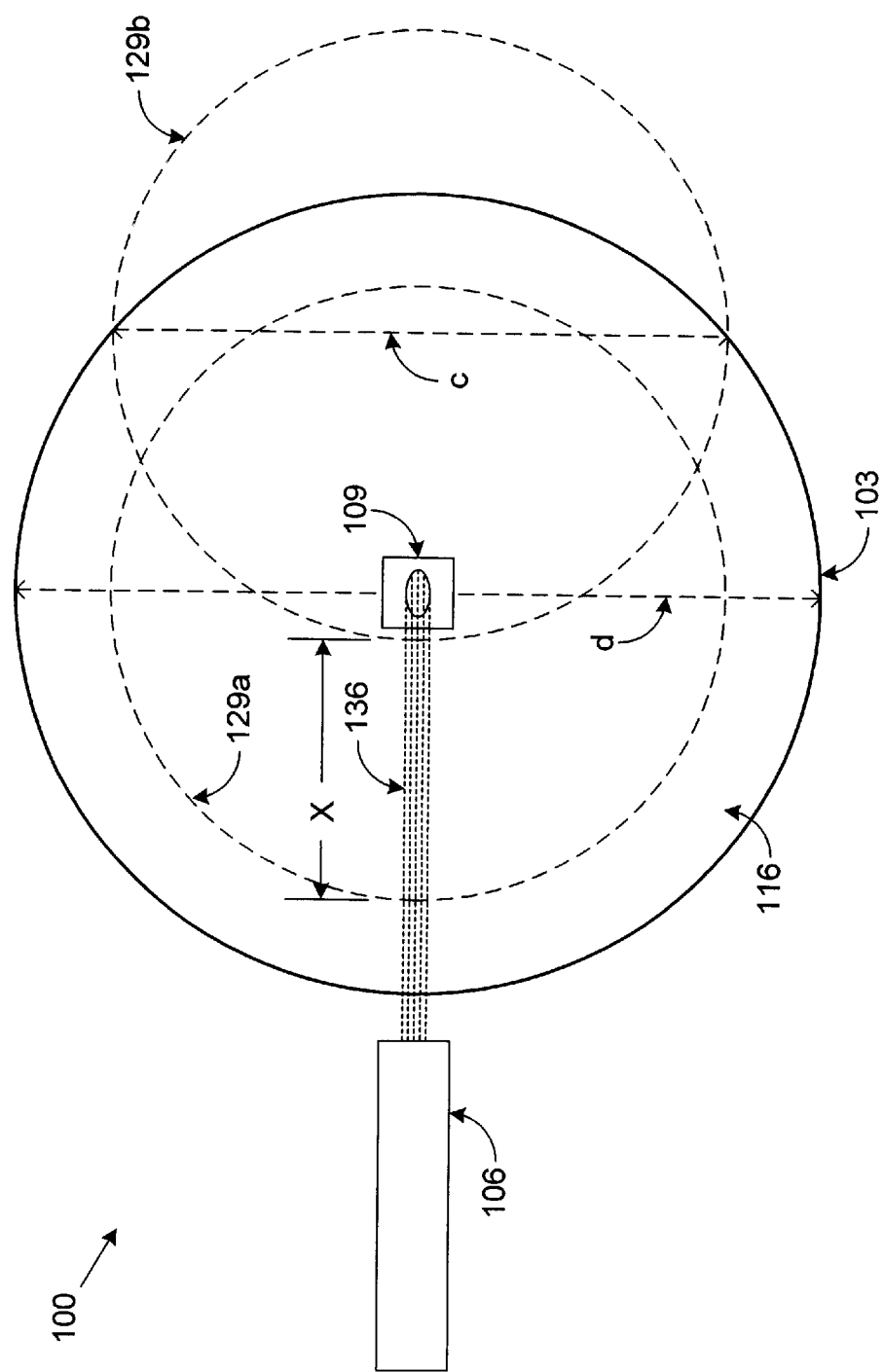

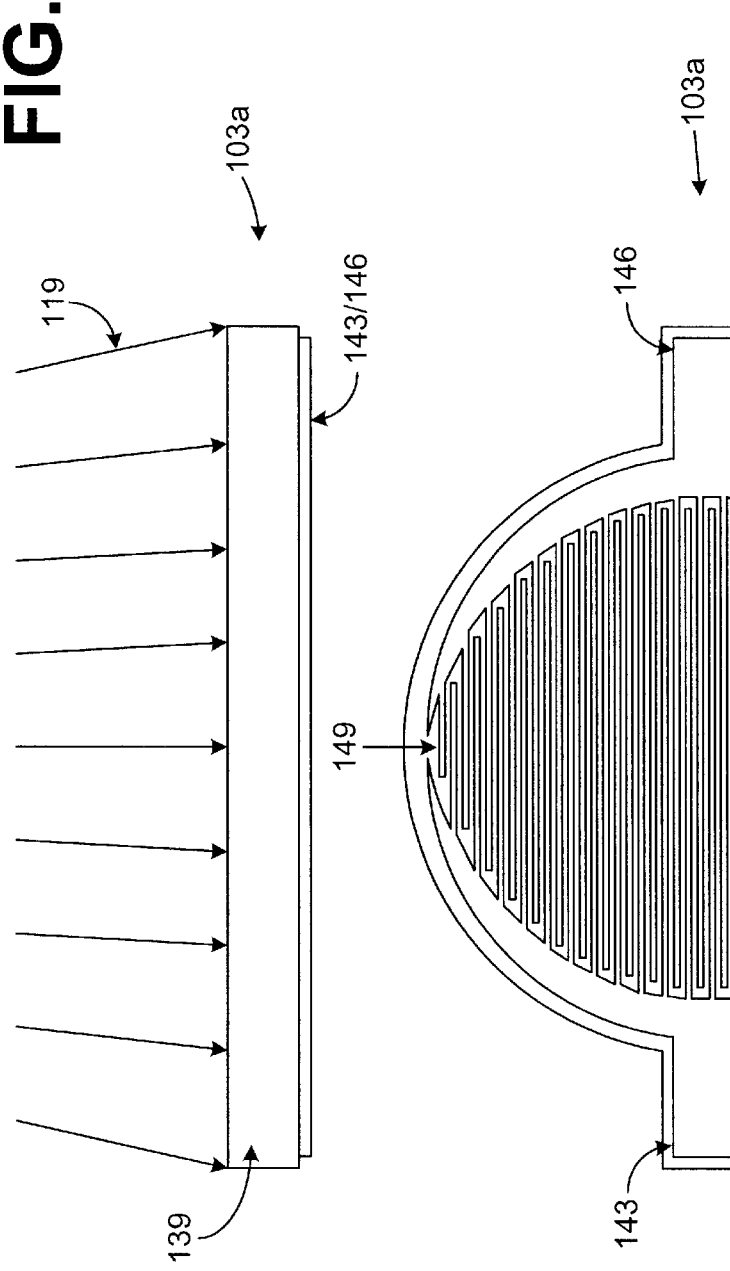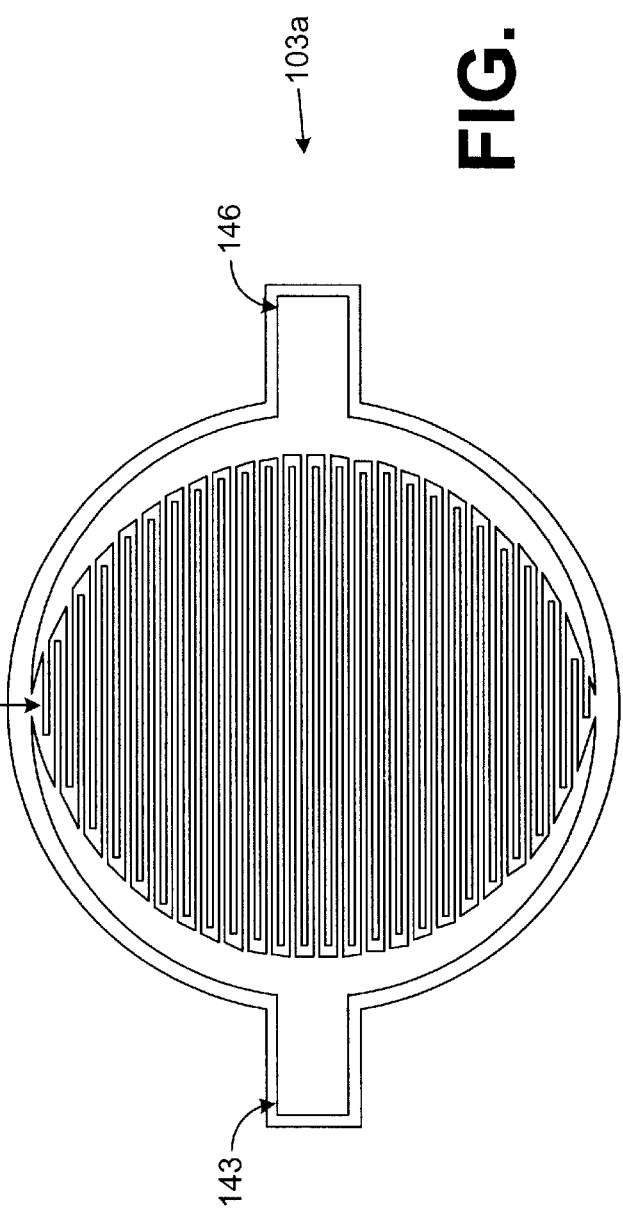

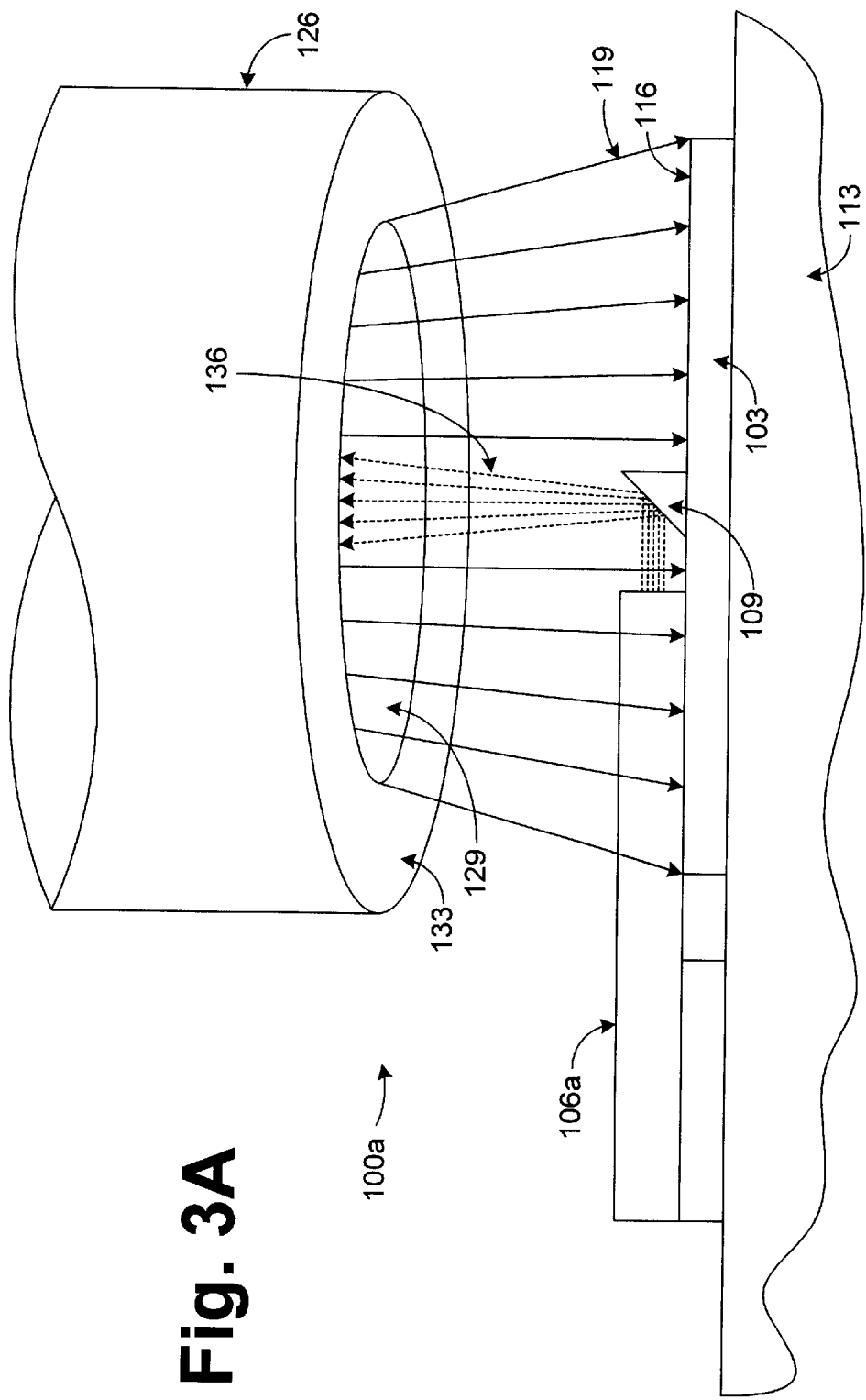

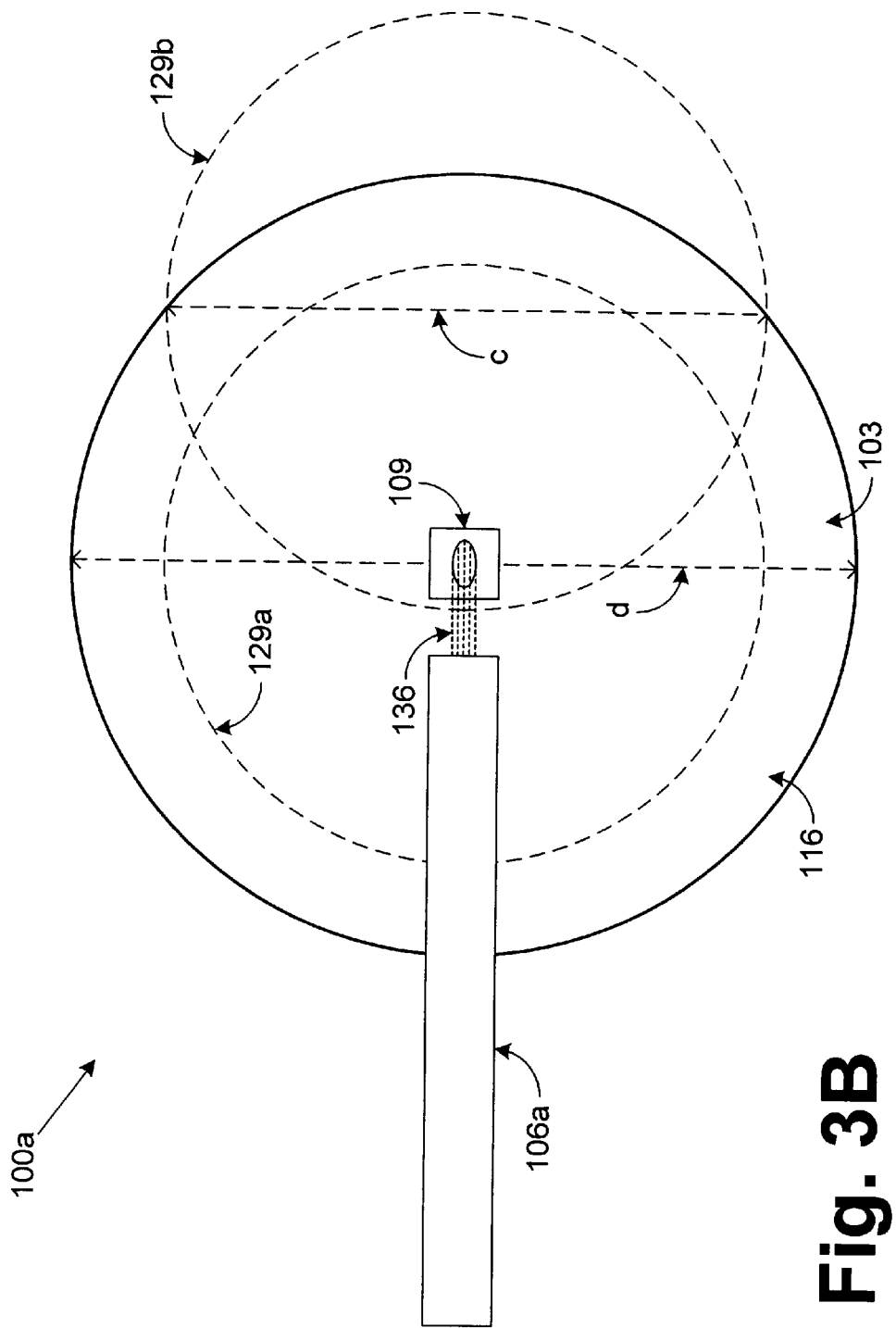

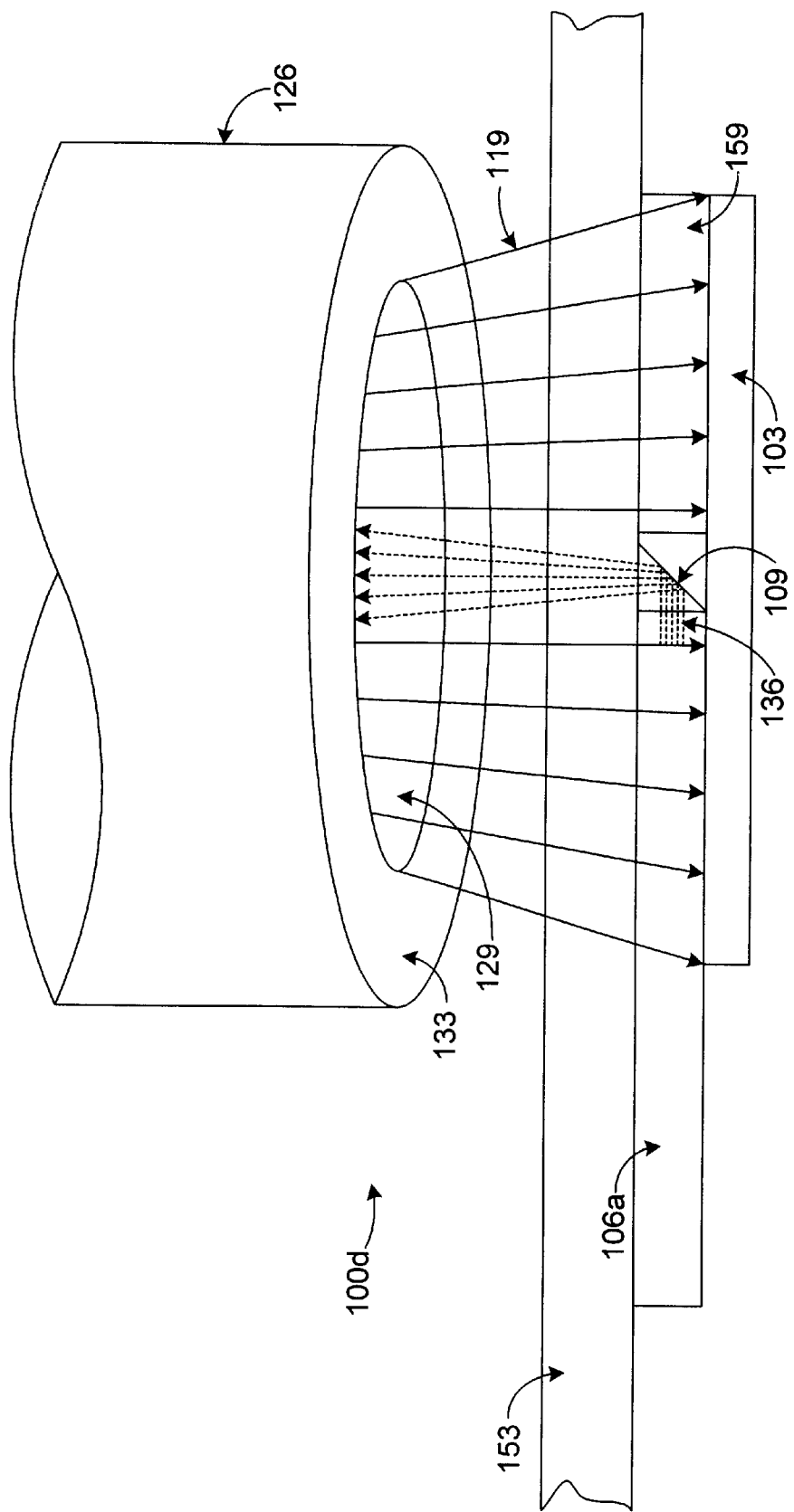

SYSTEM AND METHOD FOR BI-DIRECTIONAL OPTICAL COMMUNICATION

CROSS REFERENCE TO RELATED APPLICATION

This document claims priority to and the benefit of the filing date of co-pending and commonly assigned provisional applications entitled "Bi-Directional Single Fiber Optical Link Using Lasers and Detectors", assigned serial No. 60/097,981, filed Aug. 26, 1998, and "Bi-Directional Single Fiber Optical Link Using I-MSMS", assigned serial No. 60/097,946, filed Aug. 26, 1998, both of which are hereby incorporated herein by reference.

TECHNICAL FIELD

The present invention relates generally to the field of communications, and more particularly, to a system and method for optical bi-directional communication.

BACKGROUND OF THE INVENTION

Current communications systems and networks are becoming faster and more complex, using any one of number of mediums. Communication using these systems and networks is typically bi-directional in that signals are exchanged between two sources as they communicate for various purposes. More recently, fiber optic networks have been employed as the medium for communications. Typically, the optical fibers themselves may be very small and, consequently, coupling various devices to the optical fibers to create a communications link can be difficult and expensive.

An additional problem with current optical fiber communications systems is that optical fibers are often used for unidirectional communications. This is due in part to the difficulty of physically transmitting and receiving an optical signal on a single optical fiber that may be, for example, a single micron thick. Unfortunately, this results in the need for two optical fiber links to establish bi-directional communications.

SUMMARY OF THE INVENTION

The present invention provides a bidirectional optical link and method. In one possible embodiment, the bi-directional optical link comprises a detector having an upper surface facing a predetermined direction and a beam turning device located over the surface. The bidirectional optical link also includes an emitter oriented to direct a beam of light toward the beam turning device, the beam turning device redirecting the beam of light toward the predetermined direction.

The present invention may also be viewed as a method for conducting bi-directional optical communications, comprising the steps of positioning a detector having an upper surface to face a predetermined direction, placing a beam turning device over the upper surface, and, positioning an emitter so as to direct a beam of light toward the beam turning device so that the beam turning device redirects the beam of light toward the predetermined direction.

A significant advantage of the present invention is that it facilitates an increased positioning tolerance of the optical fiber with respect to the emitter/detector pair. Also, a single optical fiber can be used for bidirectional communication with significantly improved signal propagation. This is accomplished while reducing manufacturing costs of the optical link due to the increased positioning tolerance of the optical fiber.

Another advantage of the invention is that it is simple in design, user friendly, robust and reliable in operation, efficient in operation, and easily implemented for mass commercial production.

Other features and advantages of the present invention will become apparent to one with skill in the art upon examination of the following drawings and detailed description. It is intended that all such additional features and advantages be included herein within the scope of the present invention.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 1A is a drawing of a bi-directional communications link according to an embodiment of the present invention;

FIG. 1B is a top view of the bi-directional communications link of FIG. 1A;

FIG. 2A is a side view drawing of a detector used in the bi-directional communications link of FIGS. 1A and 1B;

FIG. 2B is a bottom view drawing of a detector used in the bi-directional communications link of FIGS. 1A and 1B.

FIG. 3A is a drawing of a bi-directional communications link according to another embodiment of the present invention;

FIG. 3B is a top view of the bi-directional communications link of FIG. 3A;

FIG. 6 is a drawing of a third bi-directional communications link using an intermediate host according to another embodiment of the present invention.

DETAILED DESCRIPTION OF THE INVENTION

Figure 4:
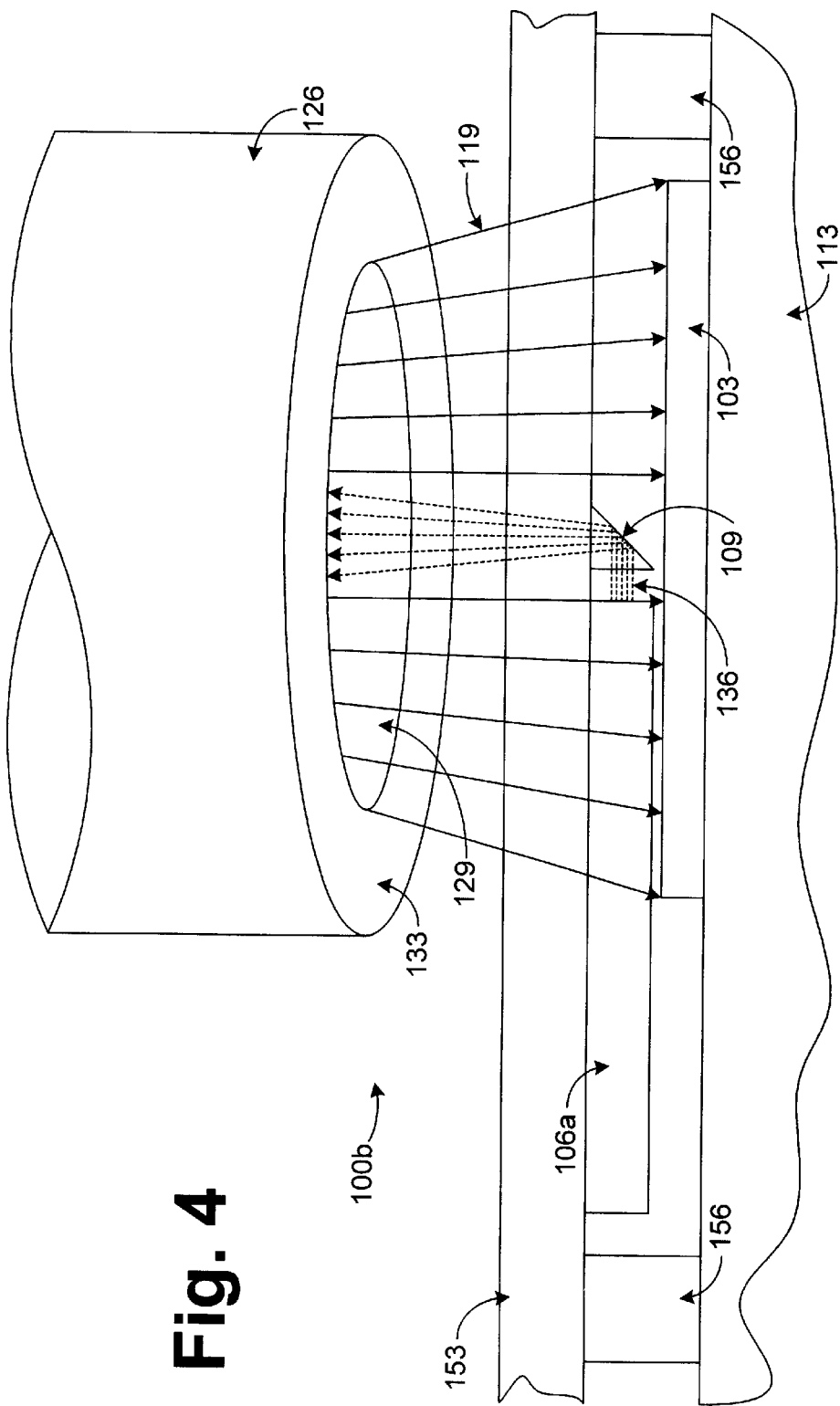
FIG. 4 is a drawing of a bi-directional communications link using an intermediate host according to another embodiment of the present invention.

With reference to FIG. 1A, shown is a bi-directional optical link 100 according to an embodiment of the present invention. The bi-directional optical link 100 includes a thin film detector 103, a thin film emitter 106, and a beam turning device 109. The detector 103 and the emitter 106 are disposed on a host substrate 113 as shown. The detector 103 is preferably flat in shape with a thickness that is, for example, relatively small. The detector 103 includes an upper surface 116 oriented to receive incident light 119 from a predetermined direction 123, that is, for example, normal to the upper surface 116. The incident light 119 propagates, for example, from an optical fiber 126 as shown where the optical fiber 126 has a core 129 and a cladding 133. The emitter 106, detector 103, and the beam turning device 109 are thin film devices.

During operation of the bidirectional optical link 100, the emitter 106 generates a beam of light 136 that is directed toward the turning device 109. The turning device 109 redirects the beam of light 136 toward the predetermined direction 123 as shown. The optical fiber 126 is positioned so as to receive the beam of light 136 and to ensure that the incident light 119 propagates from the optical fiber 126 onto the upper surface 116 of the detector 103. In other words, the optical fiber 126 is positioned so as to face the detector 103 and the turning device 109 from the predetermined direction 123. Both the incident light 119 and the beam of light 136 are modulated accordingly. In this manner, the bi-directional optical link 100 advantageously allows a single optical fiber 126 to be used for bi-directional communications.

The emitter 106 may be, for example, an edge emitting laser or an edge emitting, light emitting diode (LED), or other suitable light source. The actual component chosen as the emitter depends in part on the capabilities and attributes of the component and the particular application. For example, edge-emitting lasers allow higher speed operation than LED's, but also include higher power consumption. The emitter 106 includes electrical contacts that are bonded to the host substrate 113 using suitable conductive bonding agents such as metals, conductive polymers, conductive epoxies, and other suitable materials known in the art. In particular, the electrical contacts are preferably bonded to counterpart electrical contacts on the host substrate 113, where the circuit that drives the emitter 106 is also located on the host substrate 113. The emitter 106 may be bonded to the host substrate 113 using non-conductive bonding agents as well.

Likewise, the detector 103 includes electrical contacts that are bonded to the counterpart contacts on the substrate 113 in a similar manner to the emitter 106. The beam turning device 109 is then bonded to the upper surface 116 of the detector 103 using a nonconductive bonding agent as shown. The beam turning device 109 may be, for example, a reflective device such as a mirror. Also, optical gratings or other suitable devices may be used.

The host substrate 113 may comprise, for example, an actual circuit, glass, plastic, laminate, polymer, or other suitable material or device. The optical fiber 126 is held into place using suitable means.

Turning to FIG. 1B, shown is a top view of the bi-directional optical link 100. The detector 103 is spherical in shape with a diameter d, for example, that is larger than the diameter c of the core 129, and, given its general thickness, is in the shape of a disk. It is possible, however, that the diameter d may be any size relative to the diameter c of the core 129, depending upon the performance sought by the ultimate design. The beam turning device 109 is generally located over the detector 103 at a position approximately near the center of the detector 103. Interposed on the detector 103 and the beam turning device 109 are outlines of the core 129a and 129b of the optical fiber 126 (FIG. 1A) in first and second positions over the detector 103.

The first and second positions of the cores 129a and 129b illustrate a positioning tolerance of the bi-directional optical link 100 that is a significant advantage of the present invention. The core 129a is shown substantially centered in the detector 103, whereas the core 129b is off to the side. However, the beam turning device 109 is still positioned within the periphery of both cores 129a and 129b. It is a significant advantage that the optical fiber 126 need only be positioned relative to the detector 103 and the beam turning device 109 so as to capture the beam of light 136 redirected by the beam turning device 109, while at the same time, illuminating enough of the detector 103 with the incident light 119 (FIG. 1A) so as to be detectable. This is due to, in part, to the relatively large diameter d of the detector 103 and the relatively small size of the beam turning device 109. In terms of actual measurements, for example, given that the diameter c of the core 129 is approximately 1 micron, the size of the beam turning device 109 is much smaller. Although shown as a square, the beam turning device 109 may be any suitable shape, etc. As shown in FIG. 1B, the core 129 may be positioned over the detector 103 off center by the positioning tolerance X.

The size of the beam turning device 109 is optimized, keeping a couple of competing parameters in mind. On one hand, one wishes to maximize the size of the turning device 109 to ensure that a maximum amount of the beam of light 136 is coupled into the optical fiber 126. On the other hand, one wishes to minimize the size of the beam turning device 109 to reduce the occlusion of the detector 103 by the beam turning device 109. Thus, the actual sizes chosen for the beam turning device 109 should be specified with these competing interests in mind. Specifically, one should determine the size of the beam turning device 109 in light of the desired strength of the beam of light that is to be transmitted through the optical fiber 126 as well as a desired signal strength from the detector 103 in a worst case position of the optical fiber 126 over the detector 103.

With reference to FIGS. 2A and 2B, shown are side (FIG. 2A) and bottom (FIG. 2B) views of an inverted metal-semiconductor-metal (MSM) photodetector 103a that is preferably employed as the detector 103 (FIGS. 1A and 1B). The MSM photodetector 103a is described in detail in Jokerst, N. M. et al., *Thin Film Inverted MSM Photodetectors*, IEEE Photonics Technology Letters, Vol. 8, No. 2, (February 1996), that is incorporated herein by reference in its entirety. It is understood, however, that any detector that provides a suitable physical shape and electrical properties may be employed as the detector 103.

To provide an overview, the MSM photodetector 103a includes a first portion 139 of semiconductor material that generates photogenerated excess carriers when exposed to the incident light 119. The photodetector 103a also includes electrodes 143 and 146 with inter-digitated fingers 149. When a bias voltage is applied to the inter-digitated fingers, an electric field is formed between the adjacent fingers 149 that causes the photogenerated excess carriers to be swept from the semiconductor material into the fingers, creating a photocurrent that is proportional to the power of the incident light 119.

With reference to FIGS. 3A and 3B, shown is a bi-directional optical link 100a according to another embodiment of the present invention. The bi-directional optical link 100a is similar in most respects to the bi-directional optical link 100a except that a portion of the emitter 106a is located on the upper surface of the detector 103. This embodiment provides a distinct advantage in that the distance that the beam of light 136 travels from the emitter 106a to the beam turning device 109 is reduced such that the beam of light 136 has greater spatial coherence. Consequently, more of the light 136 will strike the beam turning device 109 and, ultimately, be transmitted through the optical fiber 126, resulting in greater transmission power. FIG. 3B shows a corresponding top view of the bi-directional optical link 100a. FIG. 3B particularly illustrates how the emitter 106a lies over a portion of the detector 103, thereby occluding that portion. The emitter 106a is chosen preferably to reduce the amount of area of the detector 103 that is occluded. Although a portion of the detector 103 is lost due to the placement of the emitter 106a in this embodiment, the gain of transmission power into the optical fiber 126 may make this embodiment preferable for some applications.

With respect to FIG. 4, shown is a bi-directional optical link 100b according to another embodiment of the present invention. The bi-directional optical link 100b includes an intermediate host 153 on which the emitter 106a and the beam turning device 109 are disposed as shown. The intermediate host 153 is comprised of, for example, silicon or other suitable materials that are transparent to allow the beam of light 136 to pass therethrough. Attached to the intermediate host 153 are spacers 156 that allow the intermediate host 153 to be placed above the detector 103 on the host substrate 113. Note that electrical connections to the emitter 106a may be made through the spacers 156 or via other conductive pathways. The detector 103 is bonded to the host substrate 113 as shown. The spacers may be attached to the intermediate host 153 using appropriate bonding materials. The intermediate host 153 along with the attached emitter 106a and beam turning device 109 are attached to the host substrate 113 by bonding the spacers to the host substrate 113. Note that the emitter 106 (FIG. 1A) may also be employed in the place of the emitter 106a so as to prevent the occlusion of the detector 103 as discussed previously.

The operation of the bi-directional optical link 100b is similar to the bi-directional optical link 100 (FIG. 1A) and is not discussed herein. The bi-directional optical link 100b provides distinct advantages in that the emitter 106a and beam turning device 109 may be bonded to the intermediate host 153. Then, assembly comprising the intermediate host 153, the emitter 106a, the beam turning device 109, and the spacers 156 is mounted on the host substrate 113.

Figure 5:
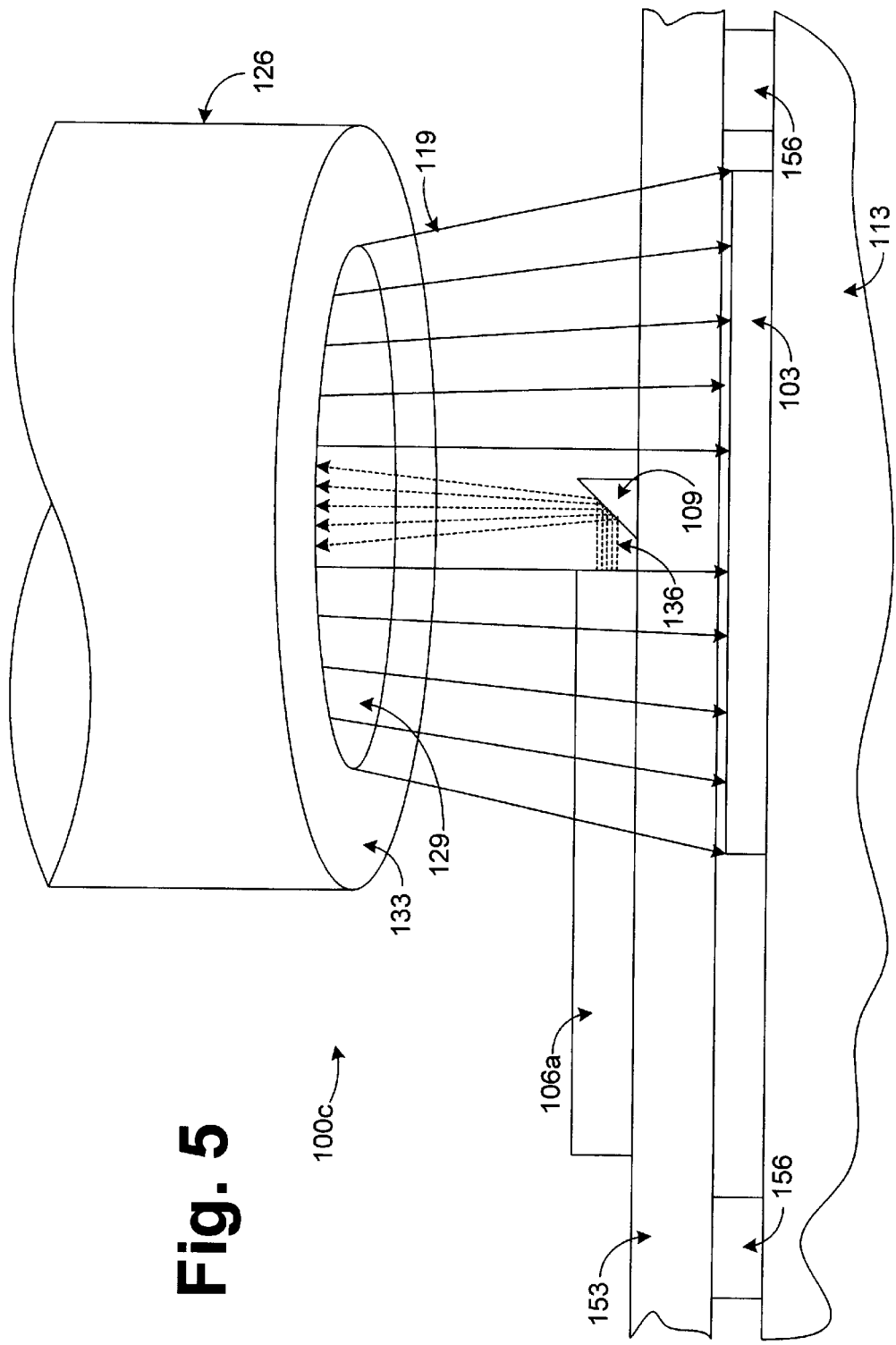
FIG. 5 is a drawing of a yet bi-directional communications link using an intermediate host according to another embodiment of the present invention.

Turning to FIG. 5, shown is a bi-directional optical link 100c according to yet another embodiment of the present invention. The bi-directional optical link 100c is similar to the bi-directional optical link 100b of FIG. 4, except that the emitter 106a and the beam turning device 109 are located on top of the intermediate host 153.

Finally, with reference to FIG. 6, shown is a bi-directional link 100d according to another embodiment of the present invention. The bi-directional link 100d includes an intermediate host 153 on which is mounted the emitter 106a, the beam turning device 109, and a spacer 159 as shown. The detector 103 is then mounted to the emitter 106a and the spacer 159 to create a unified assembly. The assembly may then be mounted on an appropriate host substrate 113 (FIG. 1A), etc. Note that the spacer 159 is preferably comprised of a transparent material to allow the incident light 119 to pass therethrough.

In addition to the forgoing, it is also possible to employ multiple stacked detectors 103 that are transparent to all but select frequencies as well as multiple emitters 106/106a to provide for multiple channel bi-directional transmission. Also, multiple detectors 103 may be arranged in an array in place of a single detector 103 in order to extend the exposure to incident light.

Many variations and modifications may be made to the above-described embodiment(s) of the invention without departing substantially from the spirit and principles of the invention. All such modifications and variations are intended to be included herein within the scope of the present invention.

Therefore, having thus described the invention, the following is claimed:

1. A bi-directional optical communications link, comprising:
   a detector having an upper surface facing a predetermined direction, the upper surface having a first portion and a second portion;
   a beam turning device located over the first portion of the upper surface and adjacent to the second portion of the upper surface; and
   an emitter oriented to direct a beam of light toward the beam turning device, the beam turning device redirecting the beam of light toward the predetermined direction.

2. The link of claim 1, wherein the emitter is an edge emitting laser.

3. The link of claim 1, wherein the emitter is an edge emitting, light emitting diode (LED).

4. The link of claim 1, wherein the emitter is positioned adjacent to the detector.

5. The link of claim 1, wherein the detector is an inverted metal-semiconductor-metal photodetector.

6. The link of claim 1, wherein a portion of the emitter is located over the upper surface of the detector.

7. A bi-directional optical communications link, comprising:
   a detector having an upper surface facing a predetermined direction, the upper surface having a first portion and a second portion; and
   an emitter having a beam turning device attached thereto, wherein the emitter is oriented to direct a beam of light toward the beam turning device, the emitter being positioned so that the beam turning device is located over the first portion of the upper surface and adjacent to the second portion of the upper surface, the beam turning device redirecting the beam of light toward the predetermined direction.

8. The link of claim 7, wherein the emitter is an edge emitting laser.

9. The link of claim 7, wherein the emitter is an edge emitting, light-emitting-diode (LED).

10. The link of claim 7, wherein the detector is an inverted metal-semiconductor-metal photodetector.

11. A bi-directional optical communications link, comprising:
    a detector mounted on a host substrate, the detector having an upper surface facing a predetermined direction;
    a beam turning device mounted to an intermediate host substrate; and
    an emitter mounted to the intermediate host substrate, wherein the emitter is oriented to direct a beam of light toward the beam turning device, the intermediate host substrate being mounted over the detector with the beam turning device located over the upper surface, the beam turning device redirecting the beam of light toward the predetermined direction.

12. The link of claim 11, wherein intermediate host substrate is in an inverted orientation with respect to the detector.

13. The link of claim 11, wherein the emitter is an edge emitting laser.

14. The link of claim 11, wherein the emitter is an edge emitting, light-emitting-diode (LED).

15. The link of claim 11, wherein the detector is an inverted metal-semiconductor-metal photodetector.

16. A bi-directional optical communications link, comprising:
    detection means for generating an electrical signal in response to an incident light falling on an upper surface from a predetermined direction, the upper surface having a first portion and a second portion;
    emission means for generating a beam of light; and beam turning means for redirecting the beam of light toward the predetermined direction, the beam turning means being located over the first portion of the upper surface and adjacent to the second portion, wherein the emission means is oriented to direct the beam of light toward the beam turning means.

17. A method for conducting bi-directional optical communications, comprising the steps of:

positioning a detector having an upper surface to face a predetermined direction, the upper surface having a first portion and a second portion;

placing a beam turning device over the first portion of the upper surface and adjacent to the second portion; and positioning an emitter so as to direct a beam of light toward the beam turning device so that the beam turning device redirects the beam of light toward the predetermined direction.

18. The method of claim 17, wherein the step of positioning the emitter further comprises the step of positioning an edge emitting laser.

19. The method of claim 17, wherein the step of positioning the emitter further comprises the step of positioning an edge emitting, light emitting diode (LED).

20. The method of claim 17, wherein the step of positioning the emitter further comprises the step of positioning the emitter adjacent to the detector.

21. The method of claim 17, wherein the step of positioning the detector further comprises the step of positioning an inverted metal-semiconductor-metal photodetector.

22. The method of claim 17, wherein the step of positioning the emitter further comprises the step of positioning the emitter so that a portion of the emitter is located over the upper surface of the detector.

23. The link of claim 1, wherein the second portion of the upper surface receives incident light from an optic fiber.

24. The link of claim 1, further including multiple stacked detectors, each of the multiple stacked detectors transparent to all but select frequencies.

25. The link of claim 1, further including an array of detectors.

26. The link of claim 1, further including multiple emitters for multiple channel, bi-directional transmission.

27. The link of claim 7, wherein the second portion of the upper surface receives incident light from an optic fiber.

28. The link of claim 11, further including multiple stacked detectors, each of the multiple stacked detectors transparent to all but select frequencies.

29. The link of claim 11, further including an array of detectors.

30. The link of claim 11, further including multiple emitters for multiple channel, bi-directional transmission.

31. The method of claim 17, further including the step of receiving incident light on the second portion of the upper surface from an optic fiber.

* * * * *